United States Patent
Galford

(10) Patent No.: US 11,156,733 B2
(45) Date of Patent: Oct. 26, 2021

(54) CALIBRATING WELLBORE SPECTROMETERS

(71) Applicant: Halliburton Energy Services, Inc., Houston, TX (US)

(72) Inventor: James E. Galford, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/754,262

(22) PCT Filed: Nov. 17, 2017

(86) PCT No.: PCT/US2017/062168
§ 371 (c)(1),
(2) Date: Apr. 7, 2020

(87) PCT Pub. No.: WO2019/099017
PCT Pub. Date: May 23, 2019

(65) Prior Publication Data
US 2020/0271800 A1    Aug. 27, 2020

(51) Int. Cl.
*G01T 1/40* (2006.01)
*G01T 1/20* (2006.01)
(Continued)

(52) U.S. Cl.
CPC ............ *G01T 1/40* (2013.01); *E21B 49/003* (2013.01); *G01V 5/06* (2013.01); *G01T 1/20* (2013.01)

(58) Field of Classification Search
CPC .. G01V 5/06; G01T 1/40; G01T 1/171; G01T 1/2006; G01T 1/202; G01T 1/208; E21B 49/00
See application file for complete search history.

(56) References Cited

U.S. PATENT DOCUMENTS 3,270,205 A   8/1966  Ladd et al.
3,270,250 A   8/1966  Davis et al.
(Continued)

FOREIGN PATENT DOCUMENTS

EP        0621494        6/1999

OTHER PUBLICATIONS

Gill et al., "User's Guide for NPSOL 5.0: A FORTRAN Package for Nonlinear Programming, Technical Report SOL 86-1", 1998, 45 pages.
(Continued)

*Primary Examiner* — David P Porta
*Assistant Examiner* — Fani Boosalis
(74) *Attorney, Agent, or Firm* — Kilpatrick Townsend & Stockton LLP

(57) ABSTRACT

A spectrometer for downhole applications can be calibrated without using radioactive sources. A spectrum of measured gamma ray counts can be received from a spectrometer in a calibration mode. A spectrum-to-window ratio can be used to determine a relationship between voltage level applied to a photoreceptor of the spectrometer and gain factors. A voltage level associated with a gain factor of one can be identified for use by the spectrometer in a non-calibration mode. The measured gamma ray counts and reference shapes for a plurality of radioactive elements can be used in a least squares fit process to determine an offset to apply to the spectrometer in the non-calibration mode.

20 Claims, 7 Drawing Sheets

(51) Int. Cl.
    *G01V 5/06*     (2006.01)
    *E21B 49/00*     (2006.01)

(56) References Cited

U.S. PATENT DOCUMENTS

| | | |
|---|---|---|
| 3,521,064 A | 7/1970 | Moran et al. |
| 3,829,686 A | 8/1974 | Schultz et al. |
| 3,976,878 A | 8/1976 | Chevalier et al. |
| 4,031,367 A | 6/1977 | Murphy et al. |
| 4,450,354 A | 5/1984 | Smith, Jr. et al. |
| 4,717,825 A | 1/1988 | Smith, Jr. et al. |
| 5,023,449 A | 6/1991 | Holenka et al. |
| 5,120,955 A | 6/1992 | Galford et al. |
| 5,360,975 A | 11/1994 | Stoller et al. |
| 5,600,135 A | 2/1997 | Jacobson |
| 7,202,456 B2 | 4/2007 | Mickael et al. |
| 8,658,968 B2 | 2/2014 | Galford et al. |
| 9,500,753 B2 * | 11/2016 | Moake .................. G01T 1/40 |
| 9,557,441 B2 | 1/2017 | Luo et al. |
| 9,702,990 B2 | 7/2017 | Mickael et al. |
| 10,006,808 B2 * | 6/2018 | Zhao ..................... G01J 1/44 |
| 2006/0065824 A1 | 3/2006 | Mickael |
| 2011/0186721 A1 | 8/2011 | Galford |

OTHER PUBLICATIONS

International Application No. PCT/US2017/062168, "International Search Report and Written Opinion", dated Aug. 17, 2018, 14 pages.

\* cited by examiner

CALIBRATING WELLBORE SPECTROMETERS

TECHNICAL FIELD

The present disclosure relates to well logging tools for wellbore operations. More specifically, but not by way of limitation, this disclosure relates to calibrating spectrometers for use in or with well logging tools.

BACKGROUND

Understanding the composition of a subterranean formation can be beneficial during various stages of wellbore operations. Three sources of natural radioactivity in the Earth include potassium, thorium, and uranium. These radioactive isotopes emit gamma rays that have characteristic energy levels. Determining the concentration of these elements in subterranean formations can be useful for a variety of purposes, including identification of clay minerals, orthoclase feldspars, and total organic content.

Spectrometers can be used to detect the radiation in spectrum. Various methods can be used to derive thorium, uranium, and potassium elemental concentrations from pulse-height gamma-ray spectra arising from gamma ray emissions surrounding the spectrometer. When combined with other geochemical logs, spectroscopy logs can allow for advanced petrophysical interpretations of complex mineralogies.

Calibration of the measured pulse-height spectra energy scale is desirable to the elemental yield analysis and determination of the corresponding formation concentrations. Some calibration techniques include using a radioactive source to produce a reference signal. Radioactive sources can be effective for calibration techniques, but also pose cost, safety, and possible introduction of error into the calibration technique as the radioactive source decays, which factors must be accounted for when using radioactive sources.

DETAILED DESCRIPTION

Figure 1:
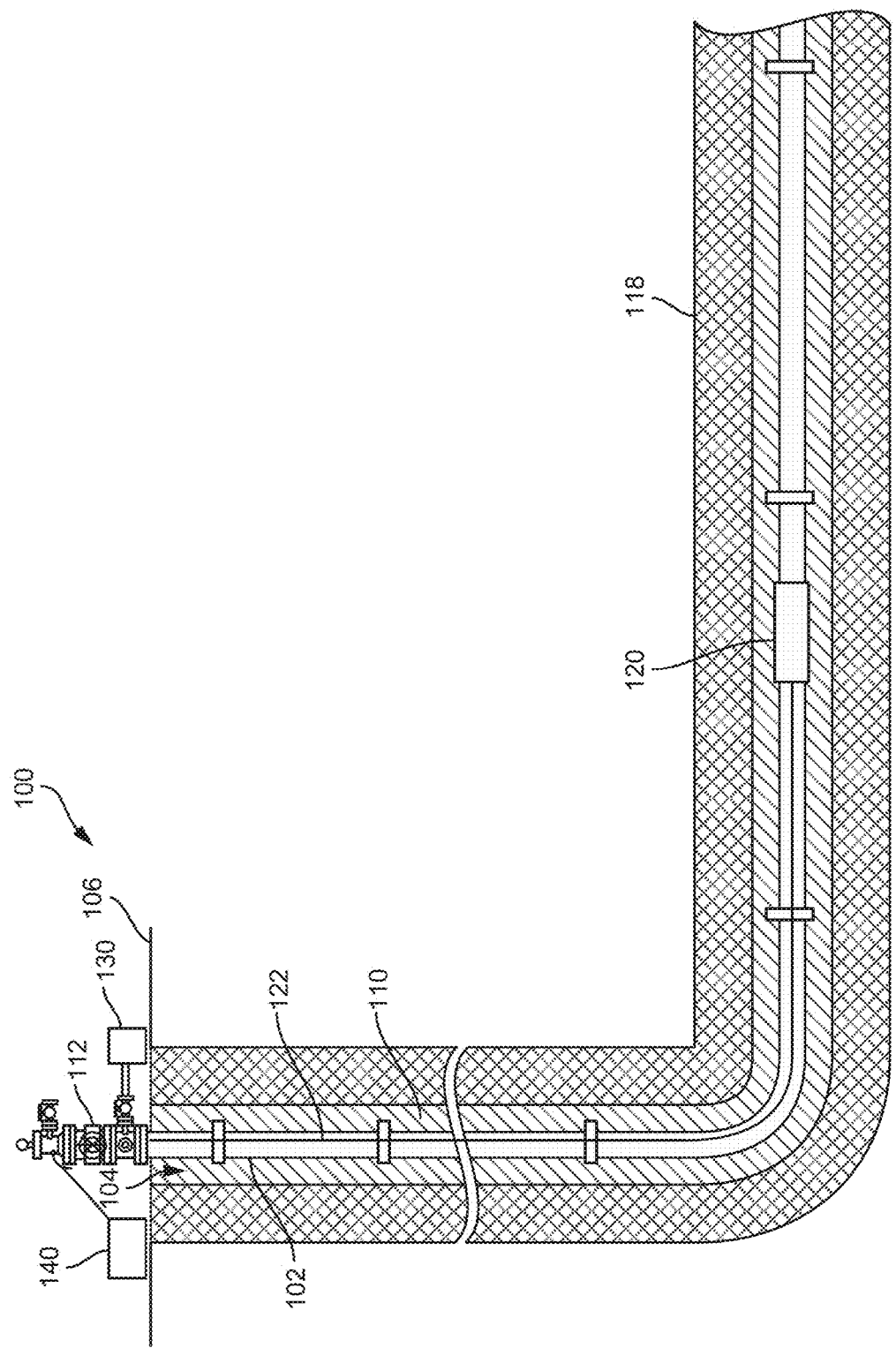
FIG. 1 is a diagram of an example of a well system including a spectrometer that can be calibrated using a spectrum-to-window ratio according to one aspect of the present disclosure.

Certain aspects and features relate to calibrating wellbore spectrometers using spectrum-to-window ratios, optionally without using radioactive sources. The spectrometers can be, for example, natural gamma ray spectrometers for measuring gamma rays produced by naturally occurring thorium and uranium decay chains and naturally occurring potassium during well logging operations. A spectrum-to-window ratio can be the ratio of a rate of events in an acquired spectrum with respect to a rate of events between two channels within the acquired spectrum. The ratio can represent how close an observed spectrum is to a desired location expressed as a gain factor ("GF"). A correspondence between gain factors and applied photomultiplier tube ("PMT") high voltages can be plotted. The plot can be used to determine how much the PMT high voltage is to be adjusted to result in a GF of 1. Reference shapes that represent radiation from different naturally occurring radioactive elements, and different combinations of those elements, can be used in a least-squares spectral fitting process to determine the weighted combination of reference spectra corresponds to the measured spectrum, so that an offset used to calibrate the spectrometer can be determined.

The spectrometer can be positioned in a wellbore and include a processing device for calibrating the spectrometer or the processing device can be positioned at a surface of the wellbore and communicate with a downhole microprocessor controlling the spectrometer via a bi-directional telemetry link. In some examples, the spectrometer can be automatically calibrated before or during logging while drilling ("LWD"), slickline, and coiled tubing deployments. The processing device can determine a spectrum-to-window ratio from a pulse-height spectrum measured by the spectrometer. The processing device can perform the least-squares spectral fitting (e.g., NPSOL optimization) to determine the GF and channel offset. The GF and channel offset can be applied to the spectrometer in a non-calibration mode to improve the quality of the spectrum measured by the spectrometer, which can be used to produce a more accurate model of the subterranean formation through which the wellbore is formed.

In some aspects, the calibration process can allow a radioactive natural gamma ray spectrometer for well logging applications to automatically calibrate the multi-channel pulse-height analyzer. The calibration process can compensate for gradual changes of the gain and channel offset variables that naturally occur during logging operations. The calibration process may be performed without the use of a particular scintillation material or reference signals from a light source such as light emitting diodes or lasers. The calibration process can eliminate the need for radioactive sources in a logging while drilling system. The calibration process can be performed independent of the ambient operating conditions in the wellbore.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional diagram of a well system 100 including a spectrometer 120 that can be calibrated by determining a spectrum-to-window ratio. The well system 100 includes a tubing string 102 positioned in a wellbore 104 that has been formed in a surface 106 of the earth and through a subterranean formation 118. The well system 100 may have been constructed and completed in any suitable manner, such as by use of a drilling assembly having a drill bit for creating the wellbore 104. The tubing string 102 may include tubular sections connected by end-to-end couplings. In some aspects, the tubing string 102 may be made of any suitable material such as steel. In some examples, cement 110 may be injected in the wellbore 104 and allowed to set between an outer surface of the tubing string 102 and an inner surface of the wellbore 104.

At the surface 106 of the wellbore 104, a tree assembly 112 may be joined to the tubing string 102. The tree assembly 112 may include an assembly of valves, spools, fittings, etc. to direct and control the flow of fluid (e.g., oil, gas, water, etc.) into or out of the wellbore 104 within the tubing string 102. For example, a pump 130 can be coupled to the tree assembly 112 for injecting a treatment fluid into the wellbore 104 as part of a hydraulic fracturing operation.

The spectrometer 120 can coupled to or included in the tubing string 102 and positioned in the wellbore 104. In this example, a cable 122 can communicatively couple the spectrometer 120 to a computing device 140 positioned at the surface 106 of the wellbore 104. The cable 122 may be routed through one or more ports in the tree assembly 112 and extend along an outer surface of the tubing string 102. The cable 122 can provide power to the spectrometer 120 from the computing device 140. The cable 122 can also allow the computing device 140 to provide instructions to the spectrometer 120 for calibrating the spectrometer. In additional or alternative examples, the spectrometer 120 can include a processing device and power source such that the spectrometer 120 can be self-powered and self-calibrating. In some aspects, the cable 122 may allow the spectrometer 120 to communicate data to the computing device 140 representing determined characteristics of the subterranean formation 118.

Instructions executed by the computing device 140, a processing device including the spectrometer 120, or both can turn on, power-up, and calibrate the spectrometer 120, which can include a multi-channel pulse-height gamma-ray spectrometer for well logging instruments detecting naturally occurring gamma rays. The instructions can be executed to cause a microprocessor that controls the operation of the spectrometer 120. The device executing the instructions can receive a pulse-height spectra and acquisition time from the spectrometer 120 and can output commands that can be processed by the microprocessor in the spectrometer 120 to control application of high voltage to a photoreceptor in the spectrometer 120 and the multi-channel pulse-height analyzer channel offset.

Figure 2:
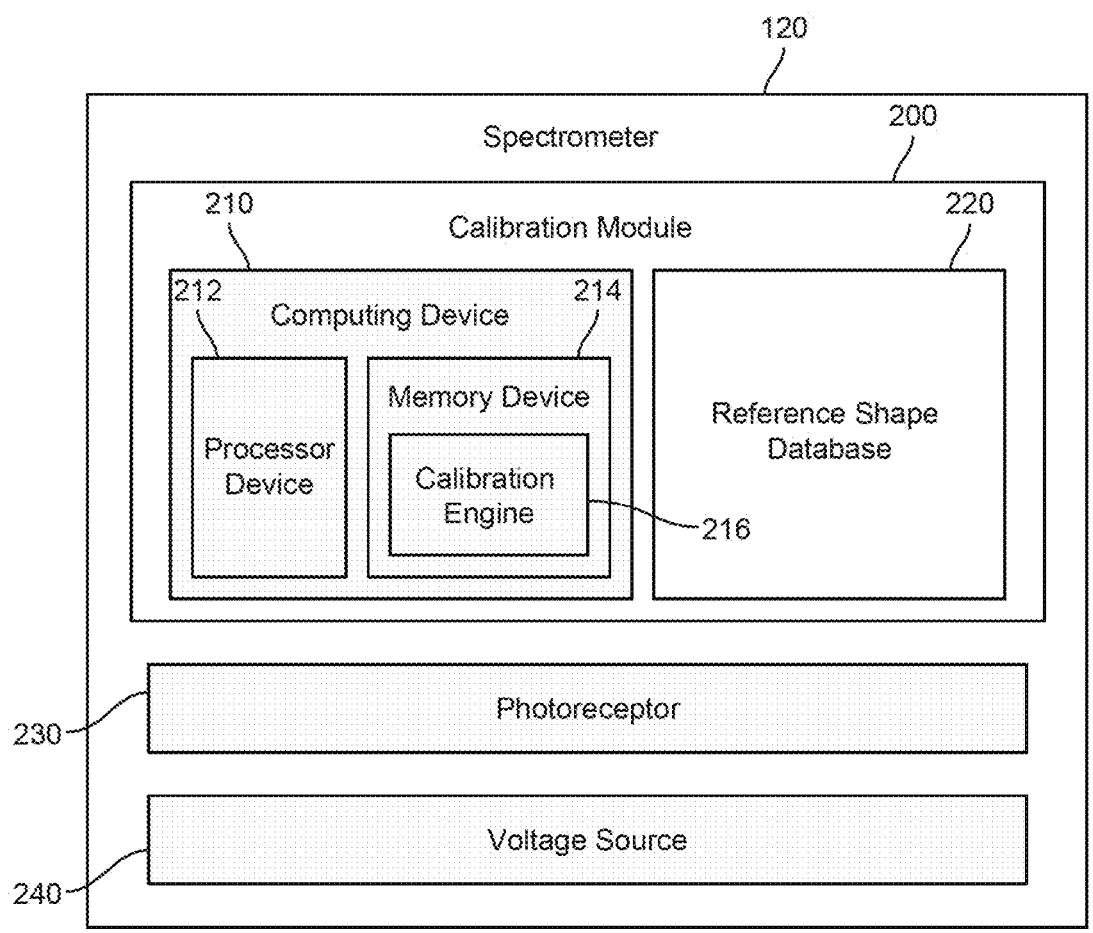
FIG. 2 is a block diagram of an example of a calibration module for a spectrometer according to one aspect of the present disclosure.

FIG. 2 is a block diagram of an example of the spectrometer 120 depicted in FIG. 1. The spectrometer 120 can include a calibration module 200, a photoreceptor 230, and a voltage source 240. The voltage source 240 can include a battery source or a wireline to a power source positioned at a surface of the wellbore 104. The voltage source can provide a voltage level to the photoreceptor 230, which can acquire spectra. The calibration module 200 can include a processing device 210 and a reference shape database 220. The computing device 210 can include a processor device 212 and a memory device 214.

The computing device 210 can include a processor device 212 configured for executing program code stored in memory device 214. Examples of the computing device 210 can include a microprocessor, an application-specific integrated circuit ("ASIC"), a field-programmable gate array ("FPGA"), or other suitable processor device. In some aspects, the computing device 210 can be a dedicated computing device used for calibrating the spectrometer 120. For example, the computing device 210 can be used for controlling a voltage level supplied by the voltage source 240 to the photoreceptor 230. In additional or alternative aspects, the computing device 210 can perform functions in addition to calibrating the spectrometer 120. For example, the computing device 210 can determine characteristics of the subterranean formation 118 using spectra captured by the photoreceptor 230 in a non-calibration mode.

The computing device 210 can include (or be communicatively coupled with) a non-transitory computer-readable memory device 214. The memory device 214 can include one or more memory devices that can store program instructions. The program instructions can include for example, a calibration engine 216 that is executable by the computing device 210 to perform certain operations or processes described herein. In some examples, the computing device 210 can execute the calibration engine 216 to perform process 300 illustrated in FIG. 3 or process 400 illustrated in FIG. 4. For purposes of explanation, the process 300 and the process 400 may be divided into a coarse adjustment phase, a fine adjustment phase, and a stabilization phase.

Although FIG. 2 depicts the calibration module 200 and the computing device 210 as part of the spectrometer 120, other implementations are possible. In some aspects, the calibration module 200 including the computing device 210 can be an independent device (e.g., a device positioned at a surface of the wellbore 104) and the computing device 210 can be communicatively coupled to another computing device in the spectrometer 120 for controlling the operation of the spectrometer 120. As depicted, the spectrometer 120 can be calibrated and detect gamma ray spectra without a radioactive source.

Figure 3:
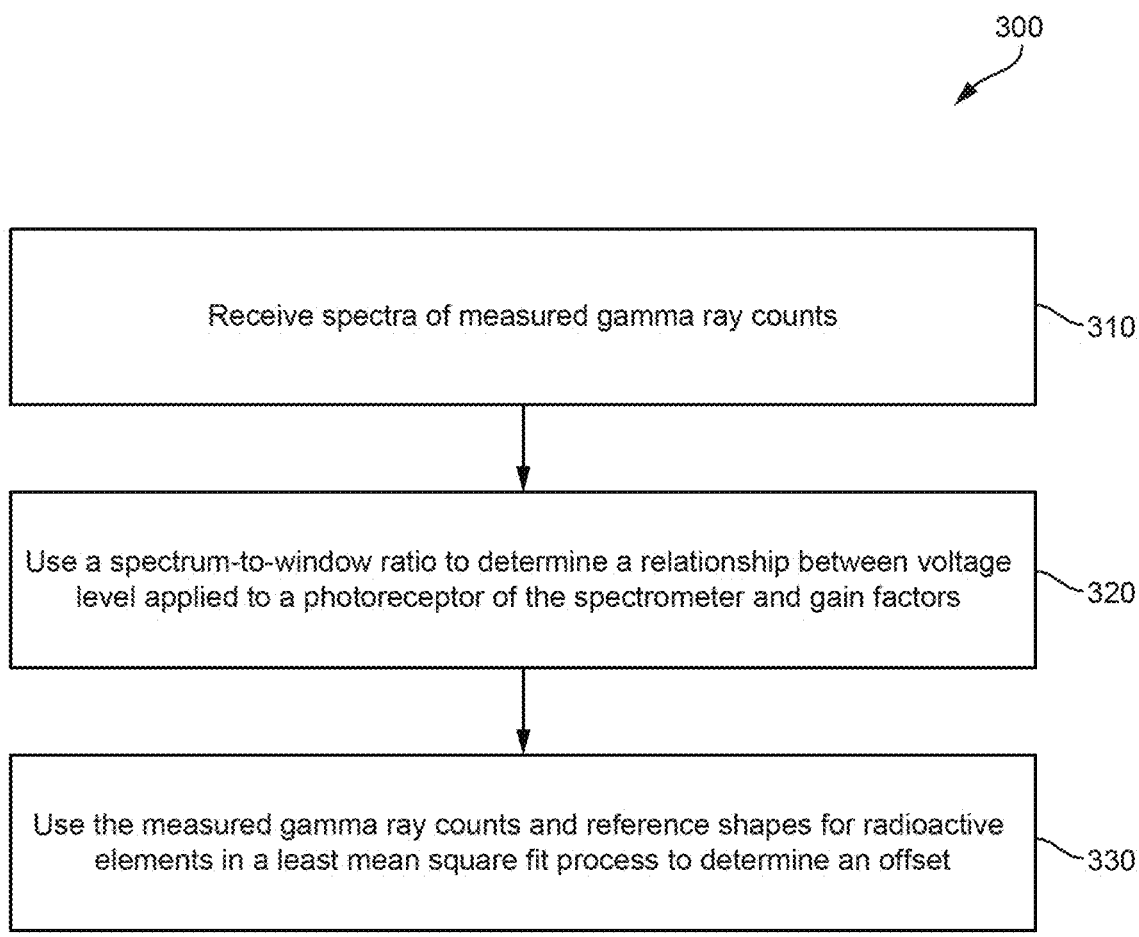
FIG. 3 is a flow chart of an example of a process for calibrating a spectrometer according to one aspect of the present disclosure.

FIG. 3 is a flow chart of an example of a process 300 for calibrating the spectrometer 120 using a spectrum-to-window ratio. In some aspects, the spectrometer 120 can be used with no a priori operating values, such as the high voltage setting for the photoreceptor 230 or the multi-channel analyzer channel offset. The process 300 may avoid using particular spectral features and may prevent radioactive sources from being included in the spectrometer 120. The process 300 can allow natural gamma ray spectrometers to be run in a wellbore in a powered off state and be turned on just prior to commencement of logging operations. In some aspects, an advantage of the calibration process 300 disclosed herein is the ability of the process 300 to calibrate and stabilize the spectrometer 120 from a powered off state in unknown and variable downhole environmental conditions. In additional or alternative aspects, the calibration process 300 can be applicable to both downhole operations and pre-job or post-job system checks with a field calibrator such as a thorium blanket.

In block 310, the computing device 210 receives a spectrum of measured gamma ray counts. In some aspects, the computing device 210 can receive the spectra of measured gamma ray counts from the photoreceptor 230. The computing device 210 can initialize a pair of status flags along with memory storage to accumulate, or integrate, measured pulse-height spectra for a given accumulation time interval. Then, the computing device 210 can cause the voltage source 240 to apply a high voltage to the photoreceptor 230 at a level well below typical operating values. The computing device 210 can enter a looping state during which measured spectra can be accumulated, evaluated, and used to modify the high voltage setting and multi-channel analyzer channel offset.

During this power-up cycle, changes in the high voltage setting can be made in a coarse step loop where a spectrum-to-window ratio is monitored. If the spectrum-to-window ratio is outside predetermined limits, the high voltage can be adjusted according to the spectrum-to-window ratio. Once the spectrum-to-window ratio is determined to be within predetermined limits, a fine-step strategy can be invoked to adjust the high voltage while the iterative process converges toward the desired calibration of the multi-channel analyzer channel-to-energy relationship.

In block 320, the computing device 210 uses a spectrum-to-window ratio to determine a relationship between voltage level applied to the photoreceptor 230 of the spectrometer 120 and GFs. The value of the GF can be used to determine when a stable high voltage setting has been achieved. In some examples, when the gain is within 0.5% of the nominal value, the stabilization flag can be set to true and the operations can begin to make incremental adjustments to the high voltage setting and the multi-channel analyzer channel offset. In additional or alternative examples, only high voltage may be adjusted as a function of the fitted GF value. During the pre-stabilization looping, a short spectral accumulation time interval can be used to hasten convergence to the desired calibration of the multi-channel analyzer channel-to-energy relationship. The spectral accumulation interval can be increased after stabilization is achieved to minimize statistical effects on the fitted gain and channel offset corrections.

In block 330, the computing device 210 uses the measured gamma ray counts and reference shapes for radioactive elements in a least squares fit process to determine an offset. In some aspects, the computing device 210 can switch to using a constrained least-squares fitting procedure in the fine-step mode, to determine corrections for gain and channel offset that correspond to the accumulated measured spectra being aligned with the standard reference thorium, uranium, and potassium spectra. In additional or alternative aspects, when the spectrometer 120 is operated in a test configuration, such as during a pre-logging or post-logging system check, an appropriate reference spectrum can be employed when performing the least-squares fitting for the gain and channel offset corrections.

Figure 4:
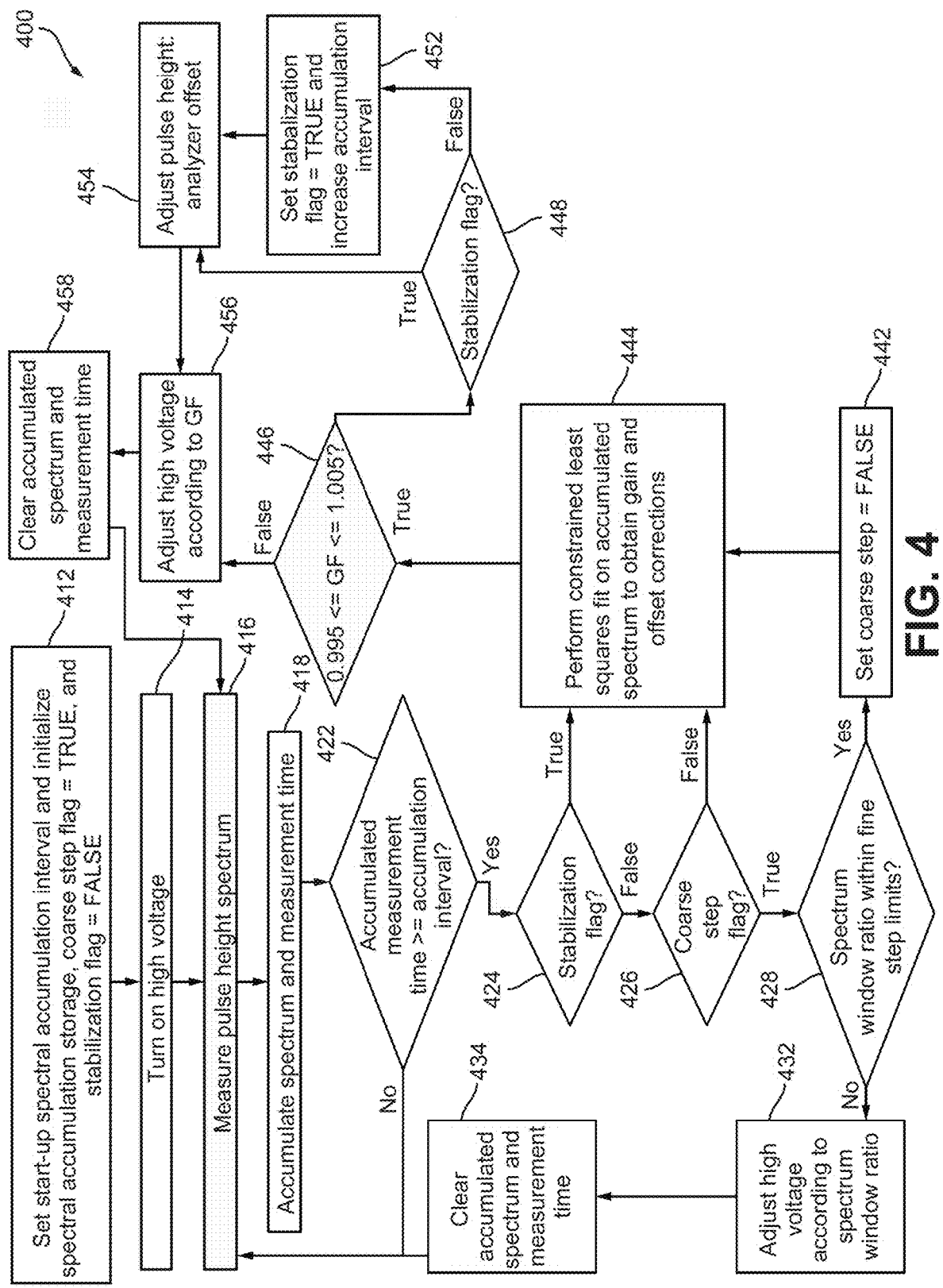
FIG. 4 is a flow chart of another example of a process for calibrating a spectrometer according to one aspect of the present disclosure.

FIG. 4 is a flow chart of another example of a process 400 for calibrating a spectrometer. In some aspects, the process 400 can be executed by a computing device positioned at a surface of the wellbore. In additional or alternative aspects, the process 400 can be executed by a computing device including in a calibration module of the spectrometer.

In block 412 a start-up spectral accumulation time interval is set, a spectral accumulation storage is initialized, a coarse step flag is set to true, and a stabilization flag is set to false. The process is initially in the coarse adjustment phase, as indicated by the assertion of the coarse step flag. In block 414, high voltage is turned on and can be applied to the photoreceptor 230 in the spectrometer 120. In some aspects, the initial voltage applied is at a level below the expected final voltage level. In block 416, the pulse height spectrum is measured. The pulse height spectrum can be measured by the computing device 210 communicatively coupled to the photoreceptor 230. In some aspects, each pulse height spectrum includes a count rate in each of several energy bins over a certain interval of time (e.g., 250 milliseconds). In block 418, the measured pulse-height spectrum and measurement time can be accumulated or recorded. In block 422, the process 400 can return to block 416 and continue measuring the pulse height spectrum until the accumulated measurement time exceeds the spectral accumulation interval. In some examples, one or more pulse-height spectra can be measured, and the counting rates in respective energy bins can be summed to create the accumulated spectrum. In some aspects, the time of the spectral accumulation interval during the coarse adjustment phase is 10 to 15 seconds, but other implementations are possible.

Once the accumulated measurement time exceeds the spectral accumulation interval, the process 400 can proceed to block 424. In block 424, the process 400 can include checking the stabilization flag and proceeding to block 426 if the stabilization flag is set to false or proceeding to block 444 if the stabilization flag is set to true. In some aspects, checking the state of the stabilization flag can be performed to determine if the process 400 has entered the stabilization phase. On at least an initial pass, the stabilization phase has not been entered, and thus the process 400 can test the state of the coarse step flag. Testing the state of the coarse step flag can be performed to determine if the process 400 is within the coarse phase.

In block 426, the process 400 can include checking the coarse step flag and proceeding to block 428 if the coarse step flag is set to true or proceeding to block 444 if the coarse step flag is set to false. In block 428, the process can include determining if the spectrum-to-window ratio is within the fine step limits and proceed to block 432 if the spectrum-to-window ratio is outside of the fine step limits or proceeding to block 442 if the spectrum-to-window ratio is within the fine step limits. The spectrum-to-window ratio can be determined by dividing a total number of gamma ray counts in the spectrum by a number of gamma ray counts in a window between two channels in the spectrum.

In block 432, the process 400 can include adjusting the high voltage according to the spectrum-to-window ratio. In block 434, the process 400 can include clearing the accumulated spectrum and measurement time. After clearing the accumulated spectrum and measurement time, the process 400 can return to block 416 and measure (or re-measure) the pulse height spectrum using the adjusted high voltage. In some aspects, the amount the high voltage is adjusted is proportional to an amount the spectrum-to-window ratio is different from a predetermined spectrum-to-window ratio. The process 400 can remain in the coarse adjustment phase (the left loop of FIG. 4), each time making adjustments to the voltage applied to the photoreceptor (and thus the gain of the spectrometer) until the spectrum-to-window ratio reaches the predetermined range (e.g., between 2 and 2.25).

In block 442, the coarse step flag can be set to false. In some aspects, the process 400 can enter the fine adjustment phase in block 442 by setting the coarse step flag to false in response to the spectrum-to-window ratio reaching the predetermined range. In block 444, a constrained least squares fit can be performed on the accumulated spectrum to obtain gain and offset corrections. In some examples, the relationship between the theoretical gain calculated and the current actual gain is shown by a GF. The GF can be a value representative of the relationship between: 1) a theoretical photoreceptor gain that should achieve the "correct" spectrum; and 2) the current actual gain (indicated by the voltage applied to the photoreceptor). The "correct" spectrum is achieved when the GF equals one. Stated otherwise, if the GF equals one, the spectrum accumulated based on the current photoreceptor gain correctly matches the reference spectrum. But, the actual voltage applied to the photoreceptor to achieve a GF of one may change from day-to-day and situation-to-situation (e.g., with changing temperature downhole, or age of the tool), and thus the GF is not consistently correlated to applied high voltage. The slope of the line that relates applied high voltage to GF, however, in many cases remains substantially constant so that when the calculated GF is not equal to one, an amount of change to the applied high voltage may be closely estimated. While the remaining description is based on the GF as the relative measure of the difference between the theoretical gain and actual gain, any measure that relates the theoretical gain calculated to the current actual gain may be equivalently used.

In block 446, the process 400 can check the GF to determine if the GF is within a predetermined range. In this example, the predetermined range is 0.995 to 1.005, but other implementations are possible. The process 400 can proceed to block 456 if the GF is outside of the predetermined range or proceed to block 448 if the GF is within the predetermined range. In some examples, once the GF falls within the predetermined window, the gain of the photoreceptor may be sufficiently calibrated that the process 400 may end. For example, the coarse adjustment phase and fine phase can be sufficient in some cases without performing the stabilization phase. But, in this example, once the GF falls within the predetermined window, the process 400 can enter the stabilization phase. In block 448, the process 400 can check the stabilization flag and proceed to block 454 if the stabilization flag is set to true or proceed to block 452 if the stabilization flag is set to false. In some aspects, the first time that the GF falls within the predetermined window, the stabilization flag may be still be set to false, and thus the process 400 proceeds to block 452. Thereafter, the process 400 can move to block 454, block 456, and block 458. The next time the process 400 reaches the block 448, the stabilization flag can be set to true and the process 400 can proceed directly to block 454.

In block 452, the stabilization flag can be set to true and the accumulation interval can be increased. In block 454, the offset of the pulse height analyzer can be adjusted. In block 456, the high voltage can be adjusted according to the GF. In block 458, the accumulated spectrum and measurement time can be cleared. After clearing the accumulated spectrum and measurement time, the process can return to block 416 and measure the pulse height spectrum using the adjusted high voltage, adjusted pulse height analyzer offset, and the increased accumulation interval.

In some aspects, the process 400 may remain in the stabilization phase (right loop of the figure) indefinitely, and particularly during actual operation, making adjustments to photoreceptor gain and offset of the A/D converter. In additional or alternative aspects, the stabilization phase may involve only adjustments to the voltage applied to the photoreceptor (based on the spectrum accumulated in the increased interval). Thus, the offset adjustment represented by block 454 may be omitted. In cases where offset correction is omitted, offset correction may be mathematically applied to the each accumulated spectrum based on offset correction determined during the inversion process.

As discussed in relation to block 444, in at least some embodiments the process 400 can perform a mathematical analysis to determine a theoretical gain, and in some cases a theoretical offset. In some aspects, the mathematical analysis is a least-squares fit of the accumulated spectrum with respect to a reference spectrum. Based on the illustrative least-squares fitting procedure, the GF (which is based on the theoretical gain) is determined by minimizing a $\chi^2$ objective function involving a system of equations which represents the total spectral response as a linear combination of reference elemental responses, or spectral standards. This system of linear equations has the form:

$$\begin{aligned}
y_1 &= S_{11}x_1 + S_{12}x_2 + S_{13}x_3 + \ldots + S_{1m}x_m \\
y_2 &= S_{21}x_1 + S_{22}x_2 + S_{23}x_3 + \ldots + S_{2m}x_m \\
y_3 &= S_{31}x_1 + S_{32}x_2 + S_{33}x_3 + \ldots + S_{3m}x_m \\
&\vdots \\
y_n &= S_{n1}x_1 + S_{n2}x_2 + S_{n3}x_3 + \ldots + S_{nm}x_m
\end{aligned}$$

where $y_i$ represents the total spectral responses in channel i of the pulse-height spectrum, $x_j$ is the elemental yield depicting the contribution of element j to the total response, and $S_{ij}$ is the standard spectral response in channel i to element j; in matrix notation the system of equations becomes y=Sx.

The, $\chi^2$ objective function is expressed as:

$$\chi^2 = \sum_i \frac{(y_i - m_i)^2}{v_i}$$

where $m_i$ is the measured response in channel i and $v_i$ is the variance of the measured response in channel i. In evaluating $\chi^2$ it is assumed the measured response is properly aligned with the standard spectra and the energy resolution of the measured and standard spectra can be the same. To accommodate departures from these assumptions, the measured responses in the $\chi^2$ equation can be transformations of actual spectrometer responses wherein adjustments for gain and channel offset have been applied. The gain of the actual spectrometer response is adjusted by 1/GF, thus in this context, GF represents the spectrometer's gain with respect to the desired nominal gain. A Gaussian broadening function is also applied to standard spectra having nominal energy resolution to account for differences between the energy resolution of the measured and standard spectra. The amount of Gaussian broadening applied is represented by a resolution factor, or RF.

The minimum $\chi^2$ occurs when its derivatives with respect to the variables, $x_j$, RF, GF, and channel offset, O, are equal to zero. The solution which satisfies this condition is found by invoking a solver code such as NPSOL which is capable of constraining the solution variables within reasonable boundary limits.

FIGS. 5-10 depict graphs of experimental results from performing process 400 and are described herein with reference to FIGS. 1 and 4, but other implementations are possible. The process 400 includes a power-up cycle with a repeating loop to monitor a spectrum-to-window ratio while the high voltage applied to the photoreceptor or photomultiplier tube ("PMT") is varied. This power-up looping process is carried out until the spectrum-to-window ratio falls within prescribed bounds. In some aspects, counting rates, or counts, in low-energy channels of a pulse-height natural gamma ray spectrum can be affected by the gain of the detector system and thus the high voltage applied to the detector photoreceptor. The observed spectrum can be compressed when the gain of the system is less than nominal. Conversely, the pulse-height spectrum can be expanded along the energy/channel axis when the gain is larger than nominal.

Figure 5:
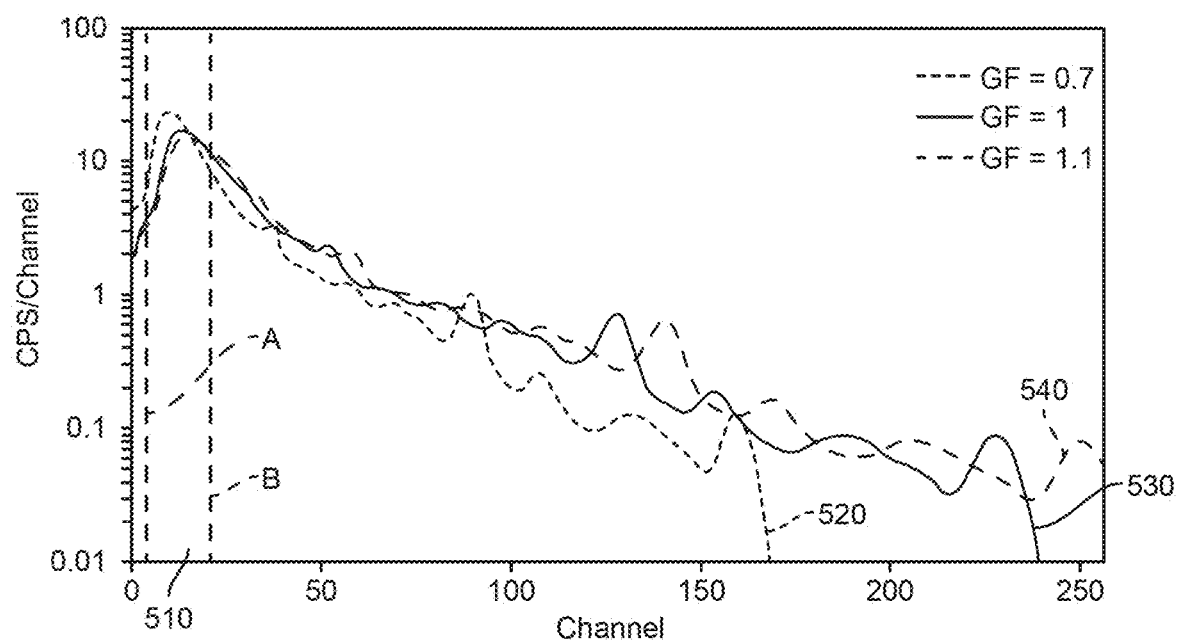
FIG. 5 is a graph of example spectra from the same gamma ray source using different gain factors according to one aspect of the present disclosure.

FIG. 5 is a graph of an example of spectra from the same gamma ray source using different GFs. A low-energy window 510, delineated by vertical dashed lines at channels A and B, indicates how the counting rate in this region changes as the gain of the spectrometer 120 changes. In this example, the low-energy window 510 spans the region from channel 4 to channel 21. The dotted curve 520 in FIG. 5 shows that an aggregate higher counting rate in the low-energy window occurs when the spectrometer gain is too low (GF=0.7) compared to the nominal gain condition (GF=1) represented by the solid line curve 530. Likewise, the cumulative counting rate can be less than the nominal counting rate in the low-energy window when the photoreceptor gain is increased beyond the nominal gain. The dashed curve 540 spectrum illustrates this for the case where the GF is 1.1.

It can be useful to exploit the behavior of the relationship between the low-energy window 510 counting rate and the gain of the photoreceptor 230 in a way that directly correlates with the gain and, therefore, the applied photoreceptor high voltage. One way to accomplish this is through the use of a spectrum-to-window counting rate ratio. This ratio can be constructed by determining the total counting rate in the spectrum beginning with channel A and dividing it by the counting rate in the low-energy window 510. The resulting spectrum-to-window ratio increases in value as the gain increases.

Figure 6:
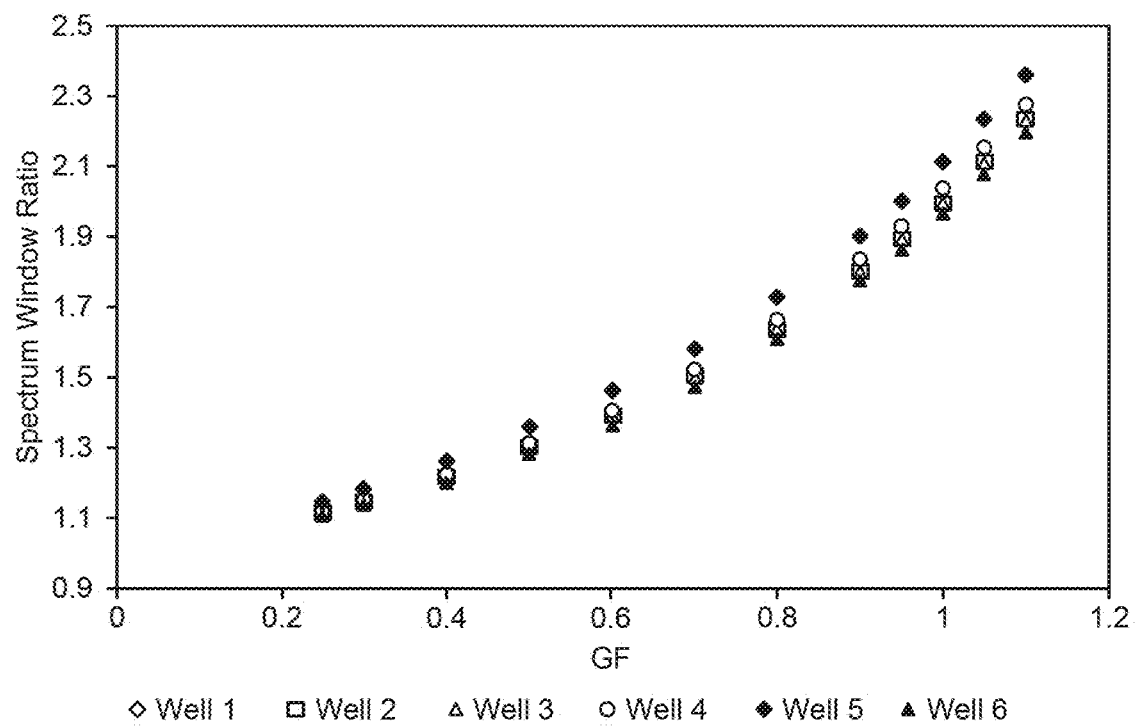
FIG. 6 is a graph of spectrum-to-window ratios and spectrometer gain factors from multiple wells according to one aspect of the present disclosure.

The spectrum-to-window ratio is not insensitive to the mixture of source gamma rays that comprise a measured spectrum. FIG. 6 shows results obtained by evaluating data derived from thousands of feet of wireline spectral gamma ray logs from six wells that include various reservoir environments such as sand-shale sequences, unconventional reservoirs, carbonates, and evaporite formations. Similar trends can be observed among the six example data sets for the relationship between the gain, expressed as a GF, and the spectrum-to-window ratio. Data from these wells were used to obtain an average relationship linking the spectrum-to-window ratio with the GF.

Figure 7:
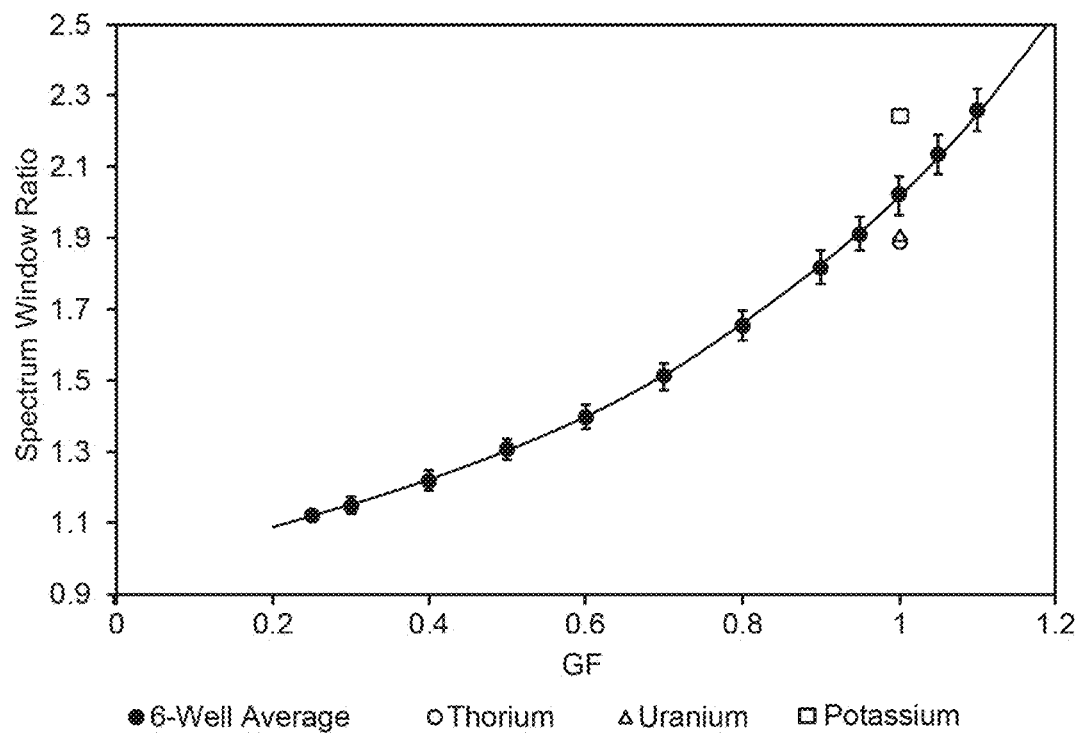
FIG. 7 is a graph of an example of average spectrum-to-window ratio responses according to one aspect of the present disclosure.

FIG. 7 is a graph of an example of average spectrum-to-window ratio responses. Black circle symbols in FIG. 7 show the average spectrum-to-window ratio responses. Error bars span one standard deviation of variation from the displayed six-well mean values. FIG. 7 also includes spectrum-to-window ratios for thorium, uranium, and potassium; they represent spectrum-to-window ratios that may be observed if the measured spectra were due to one of the three elements and can indicate the maximum range of variation. The average spectrum-to-window ratios from the six wells can be observed as within the bounds established by the pure element spectrum-to-window ratios.

Figure 8:
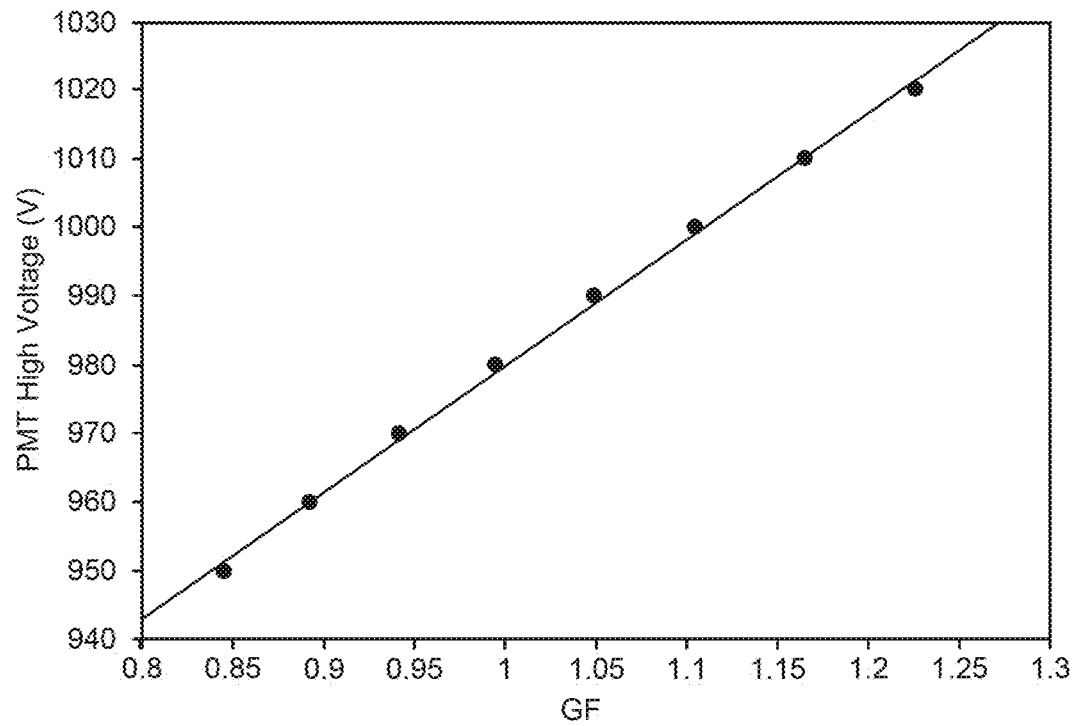
FIG. 8 is a graph of an example of a relationship between voltage applied to the photoreceptor and the gain factor of the spectrometer according to one aspect of the present disclosure.
Figure 9:
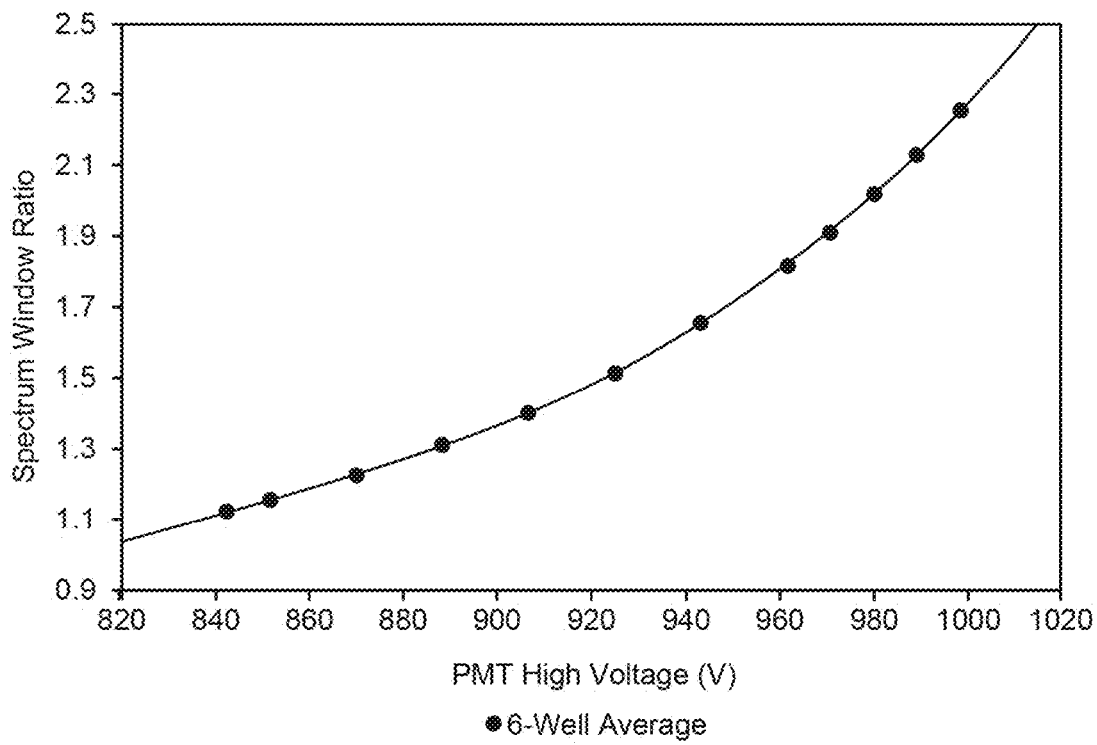
FIG. 9 is a graph of an example of the spectrum-to-window ratio changing as a function of the voltage level applied to the photoreceptor according to one aspect of the present disclosure.

FIG. 8 is a graph indicating that a direct relationship can be found between the applied photoreceptor high voltage and the GF. Once established for a particular spectrometer, this link can be used to substitute the applied photoreceptor high voltage for the GF in FIG. 7. The resulting substitution, can be depicted by FIG. 9, which demonstrates how the observed spectrum-to-window ratio changes as a function of the applied photoreceptor high voltage. The spectrum-to-window ratio and PMT high voltage relationship may vary from PMT-to-PMT.

As stated previously, during the power-up cycle the spectrum-to-window ratio can be monitored while the PMT high voltage is coarsely adjusted until the spectrum-to-window ratio falls within prescribed bounds where the gain is reasonably close to the desired calibration. For example, when the spectrum-to-window ratio for downhole logs is between 2 and 2.25, the process 400 may enter the fine adjustment loop where a least-squares fitting process is used to derive a GF that represents the discrepancy between the actual gain and the desired gain. The PMT high voltage adjustment associated with the desired gain, $\Delta$HighVoltage, can be computed from the fitted GF, $\Delta$HighVoltage=s×(1−GF) where s is the slope of the line in FIG. 8.

Figure 10:
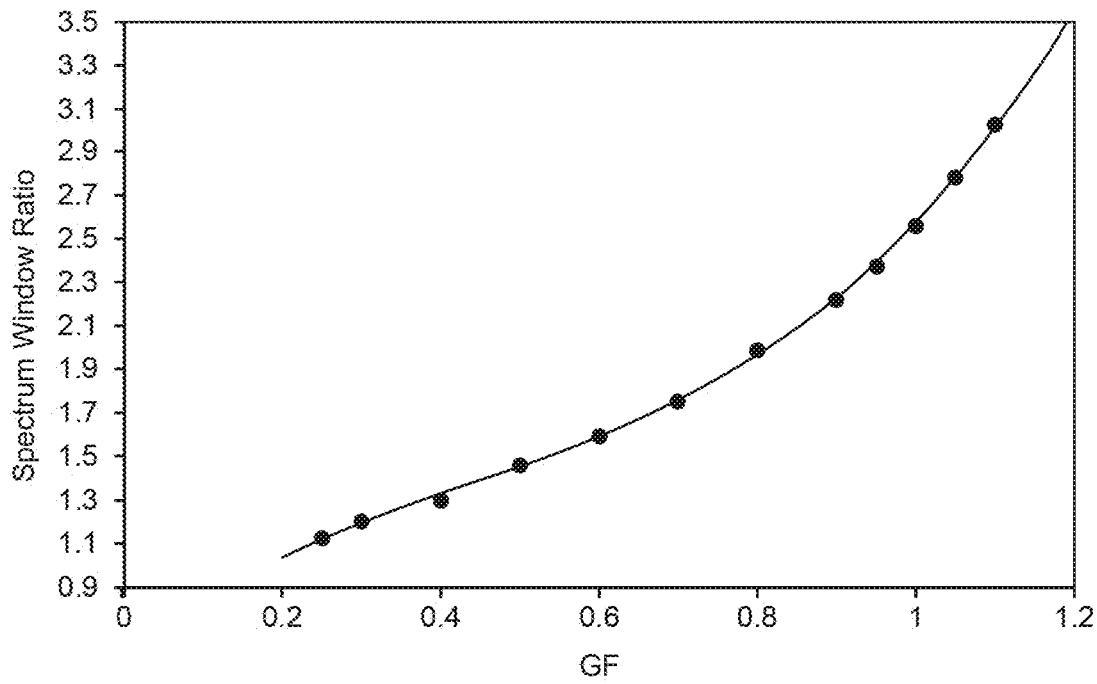
FIG. 10 is a graph of an example of data derived from a Monte Carlo modeling of a hypothetical natural gamma ray spectroscopy logging tool with a thorium blanket field calibrator according to one aspect of the present disclosure.

Similar behavior of the spectrum-to-window ratio with changing applied PMT high voltage can occur when the instrument is operated in a laboratory, pre-logging system, or post-logging system check with a thorium blanket field calibrator. FIG. 10 shows data derived from Monte Carlo modeling of a hypothetical natural gamma ray spectroscopy logging tool with a thorium blanket field calibrator positioned over the spectrometer. A slightly different relationship between the spectrum-to-window ratio and the GF can occur when the instrument is used with a field calibrator because the gamma ray transport physics can be considerably different compared to the downhole logging environment. Thus, a different set of spectrum-to-window ratio criteria may be set as the predetermined limits to enter the fine adjustment loop.

In some aspects, is provided according to one or more of the following examples:

Example #1: A method includes receiving spectra of measured gamma ray counts from a spectrometer in a calibration mode. The method also includes using a spectrum-to-window ratio to determine a relationship between voltage level applied to a photoreceptor of the spectrometer and gain factors to identify a voltage level associated with a gain factor of one to use for the spectrometer in a non-calibration mode. The method also includes using the measured gamma ray counts and reference shapes for a plurality of radioactive elements in a least squares fit process to determine an offset to apply to the spectrometer in the non-calibration mode.

Example #2: The method of Example #1 may also receive the spectra of measured gamma ray counts from the spectrometer in the calibration mode by setting a start-up spectral accumulation interval and preparing to store accumulated spectrum, setting a coarse step flag to true, setting a stabilization flag to false, and initializing a voltage that is applied to the spectrometer in the calibration mode positioned in a wellbore. And, pulse height spectra can be measured and the spectra and measurement times can be accumulated until the accumulated measurement time is the same or greater than the accumulation interval. In response to the stabilization flag being false, the coarse step flag being true, and the spectrum-to-window ratio is outside predetermined limits, the voltage can be adjusted according to the spectrum-to-window ratio, the spectrum and the measurement time can be cleared, and the pulse height spectrum can be re-measured and additional spectra and subsequent measurement times can be accumulated until the accumulated subsequent measurement time is the same or greater than the accumulation interval.

Example #3: The method of Example #2 can also include, in response to the spectrum-to-window ratio being within the predetermined limits, setting the coarse step flag to false. In response to the stabilization flag being true or the coarse step flag being false, the following can be performed. A constrained least squares fit can be performed on the accumulated spectrum to obtain gain and offset corrections. In response to the gain factor being within a predetermined range and the stabilization flag being false, the stabilization flag can be set to true and the accumulation interval can be increased. In response to the gain factor being within the predetermined range and the stabilization flag being true, a pulse height analyzer offset is adjusted. The voltage can be adjusted according to the gain factor. The accumulated spectrum and the accumulated measurement time can be cleared.

Example #4: The method of any of Examples #1-#3 can include using the spectrum-to-window ratio by determining a total number of gamma ray counts in the spectra, determining a number of gamma ray counts in a window, and determining the spectrum-to-window ratio using the total number of gamma ray counts in the spectra divided by the number of gamma ray counts in the window. The window is defined by a first channel and a second channel.

Example #5: The method of any of Examples #1-#4, where spectra can be received by receiving a plurality of spectra. Each spectrum of the plurality of spectra can include measured gamma ray counts in response to a different voltage level applied to the photoreceptor. Using the spectrum-to-window ratio to determine the relationship between voltage level applied to the photoreceptor of the spectrometer and gain factors includes comparing the spectrum-to-window ratio for each spectrum in the plurality of spectra. The spectrometer can be a natural gamma ray spectrometer that avoids the use of a radioactive source to produce the reference shapes.

Example #6: The method of any of Examples #1-#5 can include applying the voltage level associated with a gain level of one and the offset to the spectrometer. A second spectrum of gamma rays present in the wellbore can be detected by the spectrometer positioned in a wellbore using the voltage level associated with the gain level of one and the offset to the spectrometer in response to the spectrometer being in the non-calibration mode. Characteristics of radioactive elements present in a subterranean formation through which the wellbore is formed can be determined using the second spectrum.

Example #7: The method of any of Examples #1-#6, where using the measured gamma ray counts and reference shapes for a plurality of radioactive elements in a least squares fit process includes determining an expected spectrum based on a weighted combination of the reference shapes that corresponds to the measured gamma ray counts and determining the offset based on a difference between the measured spectrum and the expected spectrum.

Example #8: A non-transitory computer-readable medium in which instructions are stored. The instructions are executable by a processing device for causing the processing device to receive spectra of measured gamma ray counts from a spectrometer in a calibration mode. The instructions are also executable to cause the processing device to use a spectrum-to-window ratio to determine a relationship between voltage level applied to a photoreceptor of the spectrometer and gain factors to identify a voltage level associated with a gain factor of one to use for the spectrometer in a non-calibration mode. The instructions are also executable to cause the processing device to use the measured gamma ray counts and reference shapes for a plurality of radioactive elements in a least squares fit process to determine an offset to apply to the spectrometer in the non-calibration mode.

Example #9: The non-transitory computer-readable medium of Example #8 may also include instructions that are executable to cause the processing device to receive the spectra of measured gamma ray counts from the spectrometer in the calibration mode by setting a start-up spectral accumulation interval and preparing to store accumulated spectrum, setting a coarse step flag to true, setting a stabilization flag to false, and initializing a voltage that is applied to the spectrometer in the calibration mode positioned in a wellbore. And, pulse height spectra can be measured and the spectra and measurement times can be accumulated until the accumulated measurement time is the same or greater than the accumulation interval. In response to the stabilization flag being false, the coarse step flag being true, and the spectrum-to-window ratio is outside predetermined limits, the voltage can be adjusted according to the spectrum-to-window ratio, the spectrum and the measurement time can be cleared, and the pulse height spectrum can be re-measured and additional spectra and subsequent measurement times can be accumulated until the accumulated subsequent measurement time is the same or greater than the accumulation interval.

Example #10: The non-transitory computer-readable medium of Example #9 can also include instructions that are executable to cause a processing device to, in response to the spectrum-to-window ratio being within the predetermined limits, setting the coarse step flag to false. In response to the stabilization flag being true or the coarse step flag being false, instructions can be executed to cause the processing device to perform the following. A constrained least squares fit can be performed on the accumulated spectrum to obtain gain and offset corrections. In response to the gain factor being within a predetermined range and the stabilization flag being false, the stabilization flag can be set to true and the accumulation interval can be increased. In response to the gain factor being within the predetermined range and the stabilization flag being true, a pulse height analyzer offset is adjusted. The voltage can be adjusted according to the gain factor. The accumulated spectrum and the accumulated measurement time can be cleared.

Example #11: The non-transitory computer-readable medium of any of Examples #8-#10 can include instructions that are executable to cause the processing device to use the spectrum-to-window ratio by determining a total number of gamma ray counts in the spectra, determining a number of gamma ray counts in a window, and determining the spectrum-to-window ratio using the total number of gamma ray counts in the spectra divided by the number of gamma ray counts in the window. The window is defined by a first channel and a second channel.

Example #12: The non-transitory computer-readable medium of any of Examples #8-#11, where instructions are executable to cause spectra to be received by receiving a plurality of spectra. Each spectrum of the plurality of spectra can include measured gamma ray counts in response to a different voltage level applied to the photoreceptor. Using the spectrum-to-window ratio to determine the relationship between voltage level applied to the photoreceptor of the spectrometer and gain factors includes comparing the spectrum-to-window ratio for each spectrum in the plurality of spectra. The spectrometer can be a natural gamma ray spectrometer that avoids the use of a radioactive source to produce the reference shapes.

Example #13: The non-transitory computer-readable medium of any of Examples #8-#12 can include applying the voltage level associated with a gain level of one and the offset to the spectrometer. A second spectrum of gamma rays present in the wellbore can be received from the spectrometer positioned in a wellbore using the voltage level associated with the gain level of one and the offset to the spectrometer in response to the spectrometer being in the non-calibration mode. Characteristics of radioactive elements present in a subterranean formation through which the wellbore is formed can be determined using the second spectrum.

Example #14: The non-transitory computer-readable medium of any of Examples #8-#13, where instructions are executable to cause the processing device to use the measured gamma ray counts and reference shapes for a plurality of radioactive elements in a least squares fit process by determining an expected spectrum based on a weighted combination of the reference shapes that corresponds to the measured gamma ray counts and determining the offset based on a difference between the measured spectrum and the expected spectrum.

Example #15: A spectrometer includes a photodetector, a voltage source and a processing device. The photodetector can be positioned in a wellbore for detecting gamma rays in the wellbore. The voltage source can be conductively coupled to the photoreceptor for applying a voltage level to the photoreceptor. The processing device can be communicatively coupled to the photoreceptor for receiving spectra of measured gamma ray counts from the photoreceptor in a calibration mode, using a spectrum-to-window ratio to determine a relationship between voltage level applied to the photoreceptor and gain factors to identify a target voltage level associated with a gain factor of one for applying to the photoreceptor in a non-calibration mode, and using the measured gamma ray counts and reference shapes for a plurality of radioactive elements in a least squares fit process to determine an offset to apply to the photoreceptor in the non-calibration mode.

Example #16: The spectrometer of Example #15, where the processing device is further communicatively coupled to the photoreceptor for performing the following. Setting a start-up spectral accumulation interval and preparing to store an accumulated spectrum. Setting a coarse step flag to true. Setting a stabilization flag to false. Initializing a voltage that is applied to the photoreceptor in the calibration mode positioned in a wellbore. Measuring pulse height spectra and accumulating spectra and measurement times until the accumulated measurement time is the same or greater than the accumulation interval. In response to the stabilization flag being false, the coarse step flag being true, and the spectrum-to-window ratio outside predetermined limits: adjusting the voltage according to the spectrum-to-window ratio, clearing the accumulated spectrum and the accumulated measurement time, and re-measuring pulse height spectra and accumulating additional spectra and subsequent measurement times until the accumulated measurement time is the same or greater than the accumulation interval. In response to the spectrum-to-window ratio being within the predetermined limits, setting the coarse step flag to false. In response to the stabilization flag being true or the coarse step flag being false: performing a constrained least squares fit on the spectrum to obtain gain and offset corrections. In response to the gain factor being within a predetermined range and the stabilization flag being false, setting the stabilization flag to true and increasing the accumulation interval. In response to the gain factor being within the predetermined range and the stabilization flag being true, adjusting a pulse height analyzer offset. adjusting the voltage according to the gain factor. Clearing the accumulated spectrum and the accumulated measurement time.

Example #17: The spectrometer of any of Examples #15-#16, where the processing device is further communicatively coupled to the photoreceptor for: determining a total number of gamma ray counts in the spectra, determining a number of gamma ray counts in a window, and determining the spectrum-to-window ratio using the total number of gamma ray counts in the spectra divided by the number of gamma ray counts in the window. The window is defined by a first channel and a second channel.

Example #18: The spectrometer of any of Examples #15-#17, where the processing device is communicatively coupled to the photoreceptor for receiving the spectra by receiving a plurality of spectra. Each spectrum of the plurality of spectra including measured gamma ray counts in response to a different voltage level applied to the photoreceptor. The processing device is communicatively coupled to the photoreceptor for using the spectrum-to-window ratio to determine the relationship between the voltage level applied to the photoreceptor and gain factors by comparing the spectrum-to-window ratio for each spectrum in the plurality of spectra, the spectrometer being a natural gamma ray spectrometer that avoids the use of a radioactive source to produce the reference shapes.

Example #19: The spectrometer of any of Examples #15-#18, where the processing device is further communicatively coupled to the photoreceptor for: applying the voltage level associated with a gain level of 1 and the offset to the photoreceptor, detecting, by the photoreceptor positioned in a wellbore, a second spectrum of gamma rays present in the wellbore using the voltage level associated with the gain level of 1 and the offset to the photoreceptor in response to the photoreceptor being in the non-calibration mode, and determining, using the second spectrum, characteristics of radioactive elements present in a subterranean formation through which the wellbore is formed.

Example #20: The spectrometer of any of Examples #15-#19, where the processing device is further communicatively coupled to the photoreceptor for: determining an expected spectrum based on a weighted combination of the reference shapes that corresponds to the measured gamma ray counts, and determining the offset based on a difference between the measured spectrum and the expected spectrum.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   receiving spectra of measured gamma ray counts from a spectrometer in a calibration mode;
   determining a total number of gamma ray counts in the spectra;
   determining a number of gamma ray counts in a window, the window being defined by a first channel and a second channel;
   determining a spectrum-to-window ratio using the total number of gamma ray counts in the spectra divided by the number of gamma ray counts in the window;
   using the spectrum-to-window ratio to determine a relationship between voltage level applied to a photoreceptor of the spectrometer and gain factors to identify a voltage level associated with a gain factor of one to use for the spectrometer in a non-calibration mode; and using the measured gamma ray counts and reference shapes for a plurality of radioactive elements in a least squares fit process to determine an offset to apply to the spectrometer in the non-calibration mode.

2. The method of claim 1, wherein receiving the spectra of measured gamma ray counts from the spectrometer in the calibration mode comprising:

setting a start-up spectral accumulation interval and preparing to store accumulated spectrum;

setting a coarse step flag to true;

setting a stabilization flag to false;

initializing a voltage that is applied to the spectrometer in the calibration mode positioned in a wellbore;

measuring pulse height spectra and accumulating the spectra and measurement times until the accumulated measurement time is the same or greater than the accumulation interval; and in response to the stabilization flag being false, the coarse step flag being true, and the spectrum-to-window ratio is outside predetermined limits:
    adjusting the voltage according to the spectrum-to-window ratio;
    clearing the accumulated spectra and the measurement time; and
    re-measuring the pulse height spectra and accumulating additional spectra and subsequent measurement times until the accumulated subsequent measurement time is the same or greater than the accumulation interval.

3. The method of claim 2, further comprising:

in response to the spectrum-to-window ratio being within the predetermined limits, setting the coarse step flag to false; and in response to the stabilization flag being true or the coarse step flag being false:
    performing a constrained least squares fit on the accumulated spectrum to obtain gain and offset corrections;
    in response to the gain factor being within a predetermined range and the stabilization flag being false, setting the stabilization flag to true and increasing the accumulation interval;
    in response to the gain factor being within the predetermined range and the stabilization flag being true, adjusting a pulse height analyzer offset;
    adjusting the voltage according to the gain factor; and
    clearing the accumulated spectrum and the accumulated measurement time.

4. The method of claim 1, wherein receiving the spectra comprises receiving a plurality of spectra, each spectrum of the plurality of spectra including measured gamma ray counts in response to a different voltage level applied to the photoreceptor, wherein using the spectrum-to-window ratio to determine the relationship between voltage level applied to the photoreceptor of the spectrometer and gain factors comprises comparing the spectrum-to-window ratio for each spectrum in the plurality of spectra, the spectrometer being a natural gamma ray spectrometer that avoids the use of a radioactive source to produce the reference shapes.

5. The method of claim 1, further comprising:

applying the voltage level associated with a gain level of one and the offset to the spectrometer;

detecting, by the spectrometer positioned in a wellbore, a second spectrum of gamma rays present in the wellbore using the voltage level associated with the gain level of one and the offset to the spectrometer in response to the spectrometer being in the non-calibration mode; and determining, using the second spectrum, characteristics of radioactive elements present in a subterranean formation through which the wellbore is formed.

6. The method of claim 1, wherein using the measured gamma ray counts and reference shapes for a plurality of radioactive elements in a least squares fit process comprises:

determining an expected spectrum based on a weighted combination of the reference shapes that corresponds to the measured gamma ray counts; and determining the offset based on a difference between a measured spectrum and the expected spectrum.

7. A non-transitory computer-readable medium in which instructions are stored, the instructions being executable by a processing device for causing the processing device to:

receive spectra of measured gamma ray counts from a spectrometer in a calibration mode;

determine a total number of gamma ray counts in the spectra;

determine a number of gamma ray counts in a window, the window being defined by a first channel and a second channel;

determine a spectrum-to-window ratio using the total number of gamma ray counts in the spectra divided by the number of gamma ray counts in the window;

use the spectrum-to-window ratio to determine a relationship between voltage level applied to a photoreceptor of the spectrometer and gain factors to identify a voltage level associated with a gain factor of one to use for the spectrometer in a non-calibration mode; and use the measured gamma ray counts and reference shapes for a plurality of radioactive elements in a least squares fit process to determine an offset to apply to the spectrometer in the non-calibration mode.

8. The non-transitory computer-readable medium of claim 7, wherein the instructions for causing the processing device to receive the spectra of measured gamma ray counts from the spectrometer in the calibration mode further causes the processing device to:

set a start-up spectral accumulation interval and preparing to store an accumulated spectrum;

set a coarse step flag to true;

set a stabilization flag to false;

initialize a voltage that is applied to the spectrometer in the calibration mode positioned in a wellbore;

measure pulse height spectra and accumulating spectra and measurement times until the accumulated measurement time is the same or greater than the accumulation interval; and in response to the stabilization flag being false, the coarse step flag being true, and the spectrum-to-window ratio outside predetermined limits
    adjust the voltage according to the spectrum-to-window ratio;
    clear the accumulated spectrum and the accumulated measurement time; and
    re-measure pulse height spectra and accumulate additional spectra and subsequent measurement times until the accumulated subsequent measurement time is the same or greater than the accumulation interval.

9. The non-transitory computer-readable medium of claim 8, further comprising instructions executable by the processing device for causing the processing device to:

in response to the spectrum-to-window ratio being within the predetermined limits, set the coarse step flag to false; and in response to the stabilization flag being true or the coarse step flag being false:
perform a constrained least squares fit on the accumulated spectrum to obtain gain and offset corrections;
in response to the gain factor being within a predetermined range and the stabilization flag being false, set the stabilization flag to true and increase the accumulation interval;
in response to the gain factor being within the predetermined range and the stabilization flag being true, adjust a pulse height analyzer offset;
adjust the voltage according to the gain factor; and
clear the accumulated spectrum and the accumulated measurement time.

10. The non-transitory computer-readable medium of claim 7, wherein the instructions for causing the processing device to receive the spectra comprises causing the processing device to receive a plurality of spectra, each spectrum of the plurality of spectra including measured gamma ray counts in response to a different voltage level applied to the photoreceptor, wherein the instructions for causing the processing device to use the spectrum-to-window ratio to determine the relationship between voltage level applied to the photoreceptor of the spectrometer and gain factors comprises comparing the spectrum-to-window ratio for each spectrum in the plurality of spectra, the spectrometer being a natural gamma ray spectrometer that avoids the use of a radioactive source to produce the reference shapes.

11. The non-transitory computer-readable medium of claim 7, further comprising instructions executable by the processing device for causing the processing device to:
apply the voltage level associated with a gain level of one and the offset to the spectrometer;
receive, from the spectrometer positioned in a wellbore, a second spectrum of gamma rays present in the wellbore using the voltage level associated with the gain level of one and the offset to the spectrometer in response to the spectrometer being in the non-calibration mode; and
determine, using the second spectrum, characteristics of radioactive elements present in a subterranean formation through which the wellbore is formed.

12. The non-transitory computer-readable medium of claim 7, wherein the instructions for causing the processing device to use the measured gamma ray counts and reference shapes for a plurality of radioactive elements in a least squares fit process comprises causing the processing device to:
determine an expected spectrum based on a weighted combination of the reference shapes that corresponds to the measured gamma ray counts; and
determine the offset based on a difference between a measured spectrum and the expected spectrum.

13. A system comprising:
a photoreceptor positionable in a wellbore for detecting gamma rays in the wellbore;
a voltage source conductively coupled to the photoreceptor for applying a voltage level to the photoreceptor; and
a processing device configured for:
receiving spectra of measured gamma ray counts from the photoreceptor in a calibration mode;
using a spectrum-to-window ratio to determine a relationship between voltage level applied to the photoreceptor and gain factors to identify a target voltage level associated with a gain factor of one for applying to the photoreceptor in a non-calibration mode; and
using the measured gamma ray counts and reference shapes for a plurality of radioactive elements in a least squares fit process to determine an offset to apply to the photoreceptor in the non-calibration mode, by:
determining an expected spectrum based on a weighted combination of the reference shapes that corresponds to the measured gamma ray counts; and
determining the offset based on a difference between a measured spectrum and the expected spectrum.

14. The system of claim 13, wherein the processing device is further configured for:
setting a start-up spectral accumulation interval and preparing to store an accumulated spectrum;
setting a coarse step flag to true;
setting a stabilization flag to false;
initializing a voltage that is applied to the photoreceptor in the calibration mode;
measuring pulse height spectra and accumulating spectra and measurement times until the accumulated measurement time is the same or greater than the accumulation interval;
in response to the stabilization flag being false, the coarse step flag being true, and the spectrum-to-window ratio outside predetermined limits:
adjusting the voltage according to the spectrum-to-window ratio;
clearing the accumulated spectra and the accumulated measurement time; and
re-measuring pulse height spectra and accumulating additional spectra and subsequent measurement times until the accumulated measurement time is the same or greater than the accumulation interval;
in response to the spectrum-to-window ratio being within the predetermined limits, setting the coarse step flag to false; and
in response to the stabilization flag being true or the coarse step flag being false:
performing a constrained least squares fit on the accumulated spectra to obtain gain and offset corrections;
in response to the gain factor being within a predetermined range and the stabilization flag being false, setting the stabilization flag to true and increasing the accumulation interval;
in response to the gain factor being within the predetermined range and the stabilization flag being true, adjusting a pulse height analyzer offset;
adjusting the voltage according to the gain factor; and
clearing the accumulated spectrum and the accumulated measurement time.

15. The system of claim 13, wherein the processing device is further configured for:
determining a total number of gamma ray counts in the spectra;
determining a number of gamma ray counts in a window, the window being defined by a first channel and a second channel; and
determining the spectrum-to-window ratio using the total number of gamma ray counts in the spectra divided by the number of gamma ray counts in the window.

16. The system of claim 13, wherein the processing device is further configured for:

receiving a plurality of spectra, each spectrum of the plurality of spectra including measured gamma ray counts in response to a different voltage level applied to the photoreceptor; and comparing the spectrum-to-window ratio for each spectrum in the plurality of spectra.

17. The system of claim 13, wherein the processing device is further configured for:

operating the voltage source for to apply the voltage level associated with a gain level of 1 and the offset to the photoreceptor;

using the photoreceptor to detect a second spectrum of gamma rays present in the wellbore when the photoreceptor is in the non-calibration mode; and determining, using the second spectrum, characteristics of radioactive elements present in a subterranean formation through which the wellbore is formed.

18. A non-transitory computer-readable medium in which instructions are stored, the instructions being executable by a processing device for causing the processing device to:

receive a plurality of spectra from a spectrometer in a calibration mode, each spectrum of the plurality of spectra including measured gamma ray counts in response to a different voltage level applied to a photoreceptor;

use a spectrum-to-window ratio to determine a relationship between voltage level applied to the photoreceptor of the spectrometer and gain factors to identify a voltage level associated with a gain factor of one to use for the spectrometer in a non-calibration mode, wherein using the spectrum-to-window ratio to determine the relationship between the voltage level and the gain factors comprises comparing the spectrum-to-window ratio for each spectrum in the plurality of spectra; and use the measured gamma ray counts and reference shapes for a plurality of radioactive elements in a least squares fit process to determine an offset to apply to the spectrometer in the non-calibration mode.

19. The non-transitory computer-readable medium of claim 18, further comprising instructions that are executable by the processing device for causing the processing device to:

receive a plurality of spectra, each spectrum of the plurality of spectra including measured gamma ray counts in response to a different voltage level applied to the photoreceptor; and compare the spectrum-to-window ratio for each spectrum in the plurality of spectra.

20. The non-transitory computer-readable medium of claim 18, further comprising instructions that are executable by the processing device for causing the processing device to:

determine an expected spectrum based on a weighted combination of the reference shapes that corresponds to the measured gamma ray counts; and determine the offset based on a difference between a measured spectrum and the expected spectrum.

* * * * *